United States Patent Office 3,510,317
Patented May 5, 1970

3,510,317
PRESERVATION OF BREAD AND PASTRY
Hans Fernholz, Fischbach, Taunus, Erich Lück, Frankfurt am Main, and Hermann Neu, Neu-Isenburg, Germany, assignors to Farbwerke Hoechst Aktiengesellschaft vormals Meister Lucius & Bruning, Frankfurt am Main, Germany, a corporation of Germany
No Drawing. Filed Jan. 10, 1967, Ser. No. 608,266
Claims priority, application Germany, Jan. 20, 1966,
F 48,210
Int. Cl. A21d *15/00, 2/14*
U.S. Cl. 99—150          6 Claims

ABSTRACT OF THE DISCLOSURE

Process for preserving bread and pastry by adding to the dough prior to baking a mixed anhydride of (1) sorbic acid, and (2) an aliphatic carboxylic acid with more than 5 carbon atoms in the molecule, or a mixture of the said anhydrides.

---

In many cases antimicrobially active substances are directly mixed in a suitable form with the foodstuffs to be preserved in order to achieve a uniform distribution. In the case of pastry, the simplest mode of incorporation is the addition to the dough. Such an addition of preserving agents may, however, involve difficulties when a microbiological method is used to light the dough, for example with the aid of yeast or leaven. All known preserving agents for bakery goods, such as, for example, acetic acid, propionic acid, dehydroacetic acid, or sorbic acid and the salts thereof impair the yeast fermentation necessary to raise the dough in addition to the growth of undesired mold fungi so that with the use of an agent having a good preserving action against mold fungi the fermentation of yeast is considerably and undesirably inhibited if the said agent is incorporated with the dough prior to the baking process.

In practice, the undesired inhibting action towards bakers yeast cannot be avoided by simply reducing the amounts of preserving agent added, for in this manner the protecting effect against mold fungi in the finished pastry is suppressed or strongly diminished. Moreover, the known preserving agents do not always ensure a satisfactory protection against mold infestation since they do not have a selective action towards mold fungi.

Besides a physiologically unobjectionable character and an antibacterial efficiency, a preserving agent for pastry must have the property not to affect the taste or smell in the preparation of the dough and in the baking process so that the preserved pastry does not distinguish organoleptically from an unpreserved sample. Finally, the used preserving agent must not evaporate or decompose at the required baking temperature since otherwise it cannot develop a permanent protection in the finished pastry.

It is known that foodstuffs and other perishable goods can be preserved with the aid of mixed anhydrides of the general formula $R_1$—CO—O—CO—$R_2$ in which one of the radicals $R_1$ and $R_2$ may stand for the radical —$OR_3$ and the radicals $R_1$, $R_2$ and $R_3$ are organic radicals. With mixed anhydrides of acetic acid and sorbic acid or of propionic acid and sorbic acid, for example, fermentations, mold infestations and putrefaction can be equally avoided.

The present invention provides a process for preserving bread and pastry by adding to the dough prior to baking 0.01–3.0% by weight, calculated on the dough, of a mixed anhydride of sorbic acid and an aliphatic carboxylic acid with more than 5 carbon atoms in the molecule or a mixture of the said anhydrides. It is absolutely surprising that mixed anhydries or sorbic acid and higher fatty acids fundamentally differ from other mixed anhydrides in that they do not inhibit the activity of microbiological dough raising agents, such as, for example, yeast and leaven, and exhibit simultaneously a good action against mold fungi. The mixed anhydrides or sorbic acid and higher faty acids neither affect the pastry physiologically and organoleptically, especially as regards smell and taste, nor are they inactivated or decomposed at higher temperatures and, therefore, constitute very good preserving agents for bakery goods.

In the process according to the invention there can be used all mixed anhydrides of sorbic acid, the second acid component of which is derived from a saturated or one or several times unsaturated aliphatic fatty acid with more than 5, preferably 10 to 30 carbon atoms in the molecule, such as, for example, palmitic acid, stearic acid oleic acid, caproic acid, caprylic acid, capric acid, lauric acid, myristic acid, linoleic acid, linolenic acid, linolenic acid, lignoceric acid, elaidic, arachic acid, behenic acid, cerotic acid, ricinoleic acid, and licanic acid. For physiological reasons those acids are preferred which occur in natural fats and oils.

An especially preferred mode of application of the present process consists in using for the preparation of the second anhydride component of the mixed sorbic acid anhydrides to be used a mixture of fatty acids with 12 to 18 carbon atoms obtained by decomposition of natural fats and oils. Without separation to obtain the individual fatty acids, the mixture is converted in known manner into a mixture of fatty acid halides, preferably fatty acid chlorides, or salts, advantageously potassium salts of the fatty acids, and then reacted in known manner to yield the mixed anhydrides of sorbic acid.

The preserving agents are added to the dough directly in the form of a solution, emulsion or dispersion or in admixture with the baking fat and/or the dough raising agent. The preserving agents according to the invention can be used without any consideration of the type of dough raising agent used. They are suitable for bakery goods in which the raising of the dough is brought about by fermentation either with leaven or with yeast, as well as for those made with the use of known chemical raising agents, for example baking powder. The amounts of preserving agent required are in the range of from 0.01 to 3% by weight, preferably 0.1 to 1.5% by weight, calculated on the weight of the dough.

The process according to the invention has the advantage that the mixed anhydrides of sorbic acid and higher fatty acids have no influence whatsoever on the leaven and yeast fermentation, the consistency of the dough, the yield of the dough and the time of fermentation. After baking, the cakes exactly correspond to control cakes made without preserving agent as regards the browning, the structures of the pores and the nature of the crumb. The preserving agents according to the invention do not affect smell and taste of the bakery goods. The keeping quality of the preserved bakery goods is very good.

The following examples serve to illustrate the invention but they are not intended to limit it thereto, the percentages are by weight.

EXAMPLE 1

A dough having the following composition:

| | Grams |
|---|---|
| Wheat flour type 405 | 5,000 |
| Water | 3,000 |
| Baking margarine | 250 |
| Common salt | 80 |
| Sugar | 30 |
| Yeast | 140 | was admixed with 0.5% each of a mixed anhydride of sorbic acid with various organic acids. Each time 100 grams of the dough was filled into a wide beaker having a volume of 600 milliliters. The dough was kept at 30° C. and the time was determined until the dough had reached a volume of 230 milliliters. The results obtained are indicated in the following table:

|  | Raising time of dough in minutes |
|---|---|
| Control sample | 40–45 |
| Sorbic acid/acetic acid anhydride | 121–131 |
| Sorbic acid/propionic acid anhydride | 118–129 |
| Butyric anhydride | 108–120 |
| Sorbic acid/palmitic acid anhydride | 38–43 |
| Sorbic acid/undecylenic acid anhydrides | 40–46 |
| Sorbic acid/stearic acid anhydride | 39–47 |
| Sorbic acid/myristic acid anhydride | 38–44 |

The above table reveals that the raising time of the dough is shorter when a mixed anhydride of sorbic acid and a fatty acid with more than 5 carbon atoms is used than with the use of, for example, corresponding anhydrides of sorbic acid with carboxylic acids having shorter chains or butyric anhydride not claimed.

EXAMPLE 2

A dough as defined in Example 1 was admixed with different amounts of the mixed anhydride of sorbic acid and palmitic acid (I). Each time 100 grams of the dough were filled into a wide beaker having a volume of 600 milliliters. The dough was kept at 30° C. and the time was determined until it had reached a volume of 230 milliliters. The results are indicated in the following table:

|  | Raising time of dough in minutes |
|---|---|
| Control sample | 40–45 |
| Addition 0.3% of I | 38–43 |
| Addition 0.5% of I | 40–43 |
| Addition of 1.0% of I | 39–46 |

The addition of varying amounts of the mixed anhydride of sorbic acid and palmitic acid has no essential influence on the raising time of the dough.

EXAMPLE 3

Varying amounts of the mixed anhydride of sorbic acid and palmitic acid (I) were added to the dough as defined in Example 1 and a tin loaf was baked in usual manner (time of rest 55–65 minutes, baking time 60 minutes, baking temperature 180–200° C.). As control sample a dough prepared under the same conditions but without addition was baked.

All samples had the same volume of bread. After having been allowed to rest for identical periods of time the bread samples containing the mixed anhydride I had risen to the same volume as the control samples. Differences between the samples containing the mixed anhydride and the control samples could be observed neither with regard to the bread volume, the nature of the crust and the crumb, the pores and the elasticity of the crumb, nor in the organoleptic properties.

The finished bread was sliced and for infestation the slices were exposed to an atmosphere strongly infested with mold fungi. Some of the slices of bread were then kept in an incubator (30° C., relative atmospheric moisture 95–100%) while another part was stored at room temperature in bags of polyethylene. The growth of mold fungi in the individual samples is illustrated in the following Table I:

Explanation of symbols in Table I (also applicable to Tables II to VI)

−=no visible formation of mold
+=slight formation of mold, isolated small colonies
++=stronger formation of mold, a greater number of colonies
+++=strong formation of mold
++++=very strong formation of mold

TABLE I

| Storage in incubator | Mold formation after 2 to 8 days of storage | | | |
|---|---|---|---|---|
|  | 2 | 4 | 6 | 8 |
| Control sample | + | ++++ | ++++ | ++++ |
| 0.15% of I | − | + | ++++ | ++++ |
| 0.3% of I | − | − | ++ | +++ |
| 0.5% of I | − | − | − | − |

| Storage at room temperature | Mold formation after 2 to 20 days of storage | | | | |
|---|---|---|---|---|---|
|  | 2 | 4 | 8 | 16 | 20 |
| Control sample | − | + | ++ | ++++ | ++++ |
| 0.15% of I | − | − | − | + | ++ |
| 0.3% of I | − | − | − | + | + |
| 0.5% of I | − | − | − | − | − |

EXAMPLE 4

A dough according to the prescription of Example 1 was admixed with varying amounts of the mixed anhydride of sorbic acid and caproic acid (II) and a tin loaf was baked in usual manner (time of rest 55 to 65 minutes, baking time 60 minutes, baking temperature 180–200° C.). As control sample a bread was used which had been prepared under identical conditions but without addition.

All samples had the same volume of bread. With the same time of rest the bread samples containing the mixed anhydride II had risen to the same volume as the control samples. Differences between the samples containing the mixed anhydride II and the control samples could be observed neither with regard to the bread volume, the nature of the crust and crumb, the pore structure and the elasticity of the crumb, nor in the organoleptic properties.

The finished bread was sliced and for infestation exposed to an atmosphere strongly infested with mold fungi. Some of the slices of bread were then kept in an incubator (30° C., relative atmospheric moisture 95–100%) while another part was stored at room temperature in polyethylene bags. The growth of mold fungi in the samples is illustrated in the following Table II.

TABLE II

| Storage in incubator | Mold formation after 2 to 8 days of storage | | | |
|---|---|---|---|---|
|  | 2 | 4 | 6 | 8 |
| Control sample | + | ++++ | ++++ | ++++ |
| 0.05% of II | − | ++ | ++++ | ++++ |
| 0.10% of II | − | ++ | ++++ | ++++ |
| 0.15% of II | − | − | ++ | +++ |
| 0.3% of II | − | − | − | − |

| Storage at room temperature | Mold formation after 2 to 20 days of storage | | | | |
|---|---|---|---|---|---|
|  | 2 | 4 | 8 | 16 | 20 |
| Control sample | − | + | ++ | ++++ | ++++ |
| 0.01% of II | − | − | + | ++++ | ++++ |
| 0.05% of II | − | − | − | ++ | ++++ |
| 0.1% of II | − | − | − | − | +++ |
| 0.15% of II | − | − | − | − | + |
| 0.3% of II | − | − | − | − | − |

EXAMPLE 5

A dough prepared according to the prescription of Example 1 was admixed with varying amounts of the mixed anhydride of sorbic acid and lauric acid (III) and a tin loaf was baked in usual manner (time of rest 55–65 minutes, baking time 60 minutes, baking temperature 180–200° C.). A dough without addition prepared and baked under the same conditions was used as control sample.

All samples had the same volume of bread. After the same time of rest, the bread samples containing the mixed anhydride III had risen to the same volume as the control sample. A difference between the samples containing the mixed anhydride III and the samples without addition could be observed neither with regard to the volume of bread, the nature of the crust and crumb, the pore structure and the elasticity of the crumb, nor in the organoleptic properties.

The finished bread was sliced and for infestation exposed to an atmosphere strongly infested with mold fungi. Some of the slices were then kept in an incubator (30° C., relative atmospheric moisture 95–100%) and another part of them was stored at room temperature in polyethylene bags. The growth of mold fungi in the individual samples is illustrated in the following Table III.

TABLE III

| Storage in incubator | Mold formation after 2 to 8 days of storage | | | |
|---|---|---|---|---|
|  | 2 | 4 | 6 | 8 |
| Control samples | + | ++++ | ++++ | ++++ |
| 0.05% of III | − | ++ | ++++ | ++++ |
| 0.10% of III | − | ++ | ++++ | ++++ |
| 0.15% of III | − | − | ++ | +++ |
| 0.3% of III | − | − | − | − |

| Storage at room temperature | Mold formation after 2 to 20 days of storage | | | | |
|---|---|---|---|---|---|
|  | 2 | 4 | 8 | 16 | 20 |
| Control samples | − | + | ++ | ++++ | ++++ |
| 0.01% of III | − | − | + | ++++ | ++++ |
| 0.05% of III | − | − | − | ++ | ++++ |
| 0.1% of III | − | − | − | − | +++ |
| 0.15% of III | − | − | − | − | + |
| 0.3% of III | − | − | − | − | − |

EXAMPLE 6

A dough prepared according to the prescription of Example 1 was admixed with varying amounts of the mixed anhydride of sorbic acid and oleic acid (IV) in the form of an alcoholic solution of 20% strength and a tin loaf was baked in usual manner (time of rest 55–65 minutes, baking time 60 minutes, baking temperature 180–200° C.). A dough without addition prepared and baked under the same conditions was used as control sample.

All samples had the same volume of bread, after the same time of rest the samples containing the mixed anhydride IV had risen to the same extent as the control samples. Differences between the samples containing the mixed anhydride IV and the control samples could be observed neither with regard to the volume of bread, the nature of the crust and crumb, the pore structure and the elasticity of the crumb, nor in the organoleptic properties.

The finished bread was sliced and for infestation exposed to an atmosphere strongly infested with mold fungi. Some of the slices were then kept in an incubator (30° C., relative atmospheric moisture 95–100%) while another part was stored at room temperature in polyethylene bags. The growth of mold fungi in the individual samples is illustrated in the following Table IV.

TABLE IV

| Storage in incubator | Mold formation after 2 to 8 days of storage | | | |
|---|---|---|---|---|
|  | 2 | 4 | 6 | 8 |
| Control sample | + | ++++ | ++++ | ++++ |
| 0.15% of IV | − | + | +++ | ++++ |
| 0.3% of IV | − | − | ++ | +++ |
| 0.5% of IV | − | − | − | − |

| Storage at room temperature | Mold formation after 2 to 20 days of storage | | | | |
|---|---|---|---|---|---|
|  | 2 | 4 | 8 | 16 | 20 |
| Control sample | − | + | ++ | ++++ | ++++ |
| 0.15% of IV | − | − | − | + | ++++ |
| 0.3% of IV | − | − | − | − | ++ |
| 0.5% of IV | − | − | − | − | − |

EXAMPLE 7

A dough according to the prescription of Example 1 was admixed with varying amounts of the mixed anhydride of sorbic acid and caprylic acid (V). The preserving agent had previously been incorporated with the baking fat. A tin loaf was baked in usual manner (time of rest 55 to 65 minutes, baking time 60 minutes, baking temperature 180–200° C.). A dough without addition prepared and baked under the same conditions was used as control sample.

All samples had the same volume of bread. After the same time of rest the samples containing the mixed anhydride V had risen to the same extent as the control samples. Differences between the samples containing the mixed anhydride V and the control samples could be observed neither with regard to the volume of the bread, the nature of the crust and crumb, the pore structure and the elasticity of the crumb, nor in the organoleptic properies.

The finished bread was sliced and for infestation exposed to an atmosphere strongly infested with mold fungi. Some of the slices were then kept in an insubator (30° C., relative atmospheric moisture 95–100%) while another part was stored at room temperature in polyethylene bags. The growth of mold fungi in the individual samples is illustrated in the following Table V.

TABLE V

| Storage in incubator | Mold formation after 2 to 8 days of storage | | | |
|---|---|---|---|---|
|  | 2 | 4 | 6 | 8 |
| Control sample | + | ++++ | ++++ | ++++ |
| 0.15% of V | − | + | +++ | ++++ |
| 0.3% of V | − | − | ++ | +++ |
| 0.5% of V | − | − | − | − |

| Storage at room temperature | Mold formation after 2 to 20 day of storage | | | | |
|---|---|---|---|---|---|
|  | 2 | 4 | 8 | 16 | 20 |
| Control sample | − | + | ++ | ++++ | ++++ |
| 0.15% of V | − | − | − | + | ++ |
| 0.3% of V | − | − | − | + | + |
| 0.5% of V | − | − | − | − | − |

EXAMPLE 8

A rye-flour-leaven dough of usual composition was admixed with varying amounts of the mixed anhydride of sorbic acid and capric acid (VI) and a bread was baked in usual manner (time of rest 4 hours, baking time 60 minutes, baking temperature 230–250° C.). A dough without addition prepared and baked under the same conditions was used as control sample.

All samples had the same volume of bread. After the same time of rest the samples containing the mixed anhydride VI had risen to the same extent as the control samples. Differences between the samples containing the mixed anhydride VI and the control samples could be observed neither with regard to the volume of bread, the nature of crust and crumb, the pore structure and the elasticity of the crumb, nor in the organoleptic properties.

The finished bread was sliced and for infestation exposed to an atmosphere strongly infested with mold fungi. Some of the slices were then kept in an incubator (30° C., relative atmospheric moisture 95–100%) while another part was stored at room temperature in polyethylene bags. The growth of the mold fungi in the individual samples is illustrated in the following Table VI.

TABLE VI

| Storage in incubator | Mold formation after 2 to 8 days of storage | | | |
|---|---|---|---|---|
| | 2 | 4 | 6 | 8 |
| Control sample | + | ++ | ++++ | ++++ |
| 0.15% of VI | − | + | +++ | ++++ |
| 0.3% of VI | − | − | ++ | +++ |
| 0.5% of VI | − | − | − | − |

| Storage at room temperature | Mold formation after 2 to 20 days of storage | | | | |
|---|---|---|---|---|---|
| | 2 | 4 | 8 | 16 | 20 |
| Control sample | − | − | + | ++ | ++++ |
| 0.1% of VI | − | − | − | + | ++++ |
| 0.2% of VI | − | − | − | + | ++ |
| 0.3% of VI | − | − | − | − | ++ |
| 0.5% of VI | − | − | − | − | − |

An equally good effect could be obtained with mixed anhydrides of sorbic acid and stearic acid, linoleic acid, linolenic acid and other higher aliphatic carboxylic acids, respectively.

EXAMPLE 9

A dough according to the prescription of Example 1 was admixed with varying amounts of the mixed anhydride of sorbic acid with a mixture of technical grade fatty acids having 12 to 18 carbon atoms (VII). The preserving agent had been incorporated with the baking fat. A tin loaf was baked in usual manner (time of rest 55–65 minutes, baking time 60 minutes, baking temperature 180–200° C.). A dough without addition prepared and baked under the same conditions was used as control sample.

All samples had the same volume of bread. After the same time of rest the samples containing the mixed anhydride VII had risen to the same extent as the control samples. Differences between the samples containing the mixed anhydride VII and the control samples could be ascertained neither with regard to the volume of bread, the nature of the crust and crumb, the structure of the pores and the elasticity of the crumb, nor in the organoleptic properties.

The finished bread was sliced and for infestation exposed to an atmosphere strongly infested with mold fungi. Some of the slices were then kept in an incubator (30° C., relative atmospheric moisture 95–100%) while another part was stored at room temperature in polyethylene bags. The growth of mold fungi in the individual samples is illustrated by the following table.

TABLE VII

| Storage in incubator | Mold formation after 2 to 8 days of storage | | | |
|---|---|---|---|---|
| | 2 | 4 | 6 | 8 |
| Control sample | + | ++++ | ++++ | ++++ |
| 0.15% of VII | − | + | ++ | ++++ |
| 0.3% of VII | − | − | ++ | +++ |
| 0.5% of VII | − | − | − | − |

| Storage at room temperature | Mold formation after 2 to 20 days of storage | | | | |
|---|---|---|---|---|---|
| | 2 | 4 | 8 | 16 | 20 |
| Control sample | − | + | ++ | ++++ | ++++ |
| 0.15% of VII | − | − | − | + | ++ |
| 0.3% of VII | − | − | − | + | + |
| 0.5% of VII | − | − | − | − | − |

What is claimed is:

1. A process for preserving bread and pastry which comprises adding to the dough prior to baking 0.01 to 3.0% by weight, calculated on the dough a mixed anhydride of (1) sorbic acid, and (2) an aliphatic carboxylic acid with 10 to 30 carbon atoms in the molecule, or a mixture of said anhydrides.

2. The process of claim 1, wherein 0.1 to 1.5% by weight of the mixed anhydride is added to the dough.

3. The process of claim 1, wherein the mixed anhydride is directly added to the dough.

4. The process of claim 1, wherein the mixed anhydride is added to the baking fat.

5. The process of claim 1, wherein the mixed anhydride is added to the dough raising agent.

6. A process for preserving bread and pastry which comprises adding to the dough prior to baking 0.01 to 3.0% by weight, calculated on the dough, of a mixed anhydride of (1) sorbic acid, and (2) carboxylic acids occurring in natural fats or oils, or a mixture of the said anhydrides.

References Cited

UNITED STATES PATENTS 2,997,394   8/1961   Melnick et al. _____ 99—90
3,097,996   7/1963   Thoma et al. _____ 99—150 XR LIONEL M. SHAPIRO, Primary Examiner J. R. HOFFMAN, Assistant Examiner U.S. Cl. X.R.

99—90, 92